Sept. 10, 1935.  J. W. CONKLIN  2,014,102
DIRECT READING VACUUM TUBE METER
Filed May 29, 1934
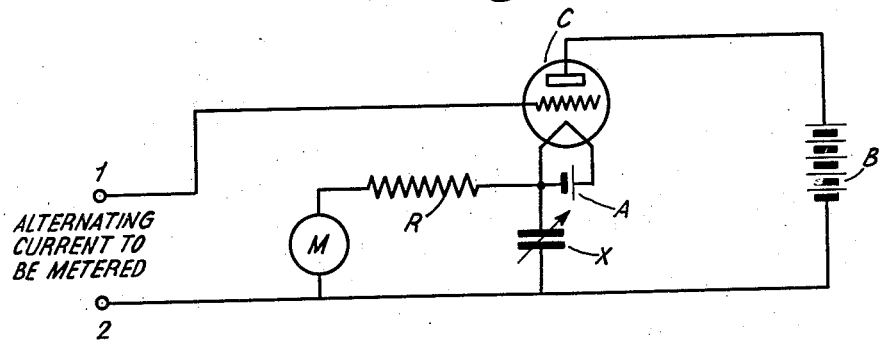
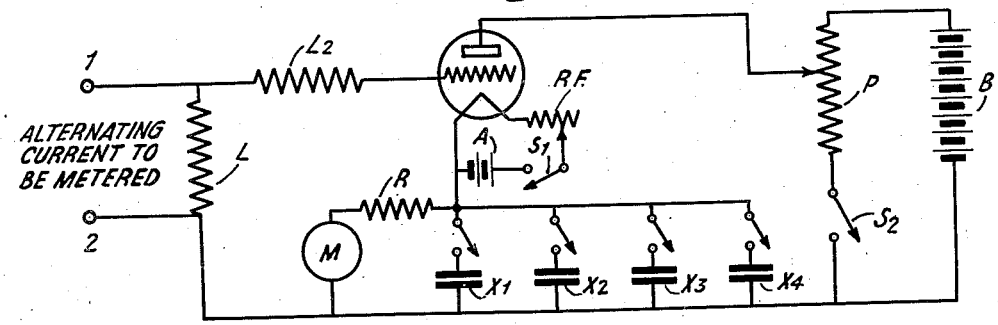
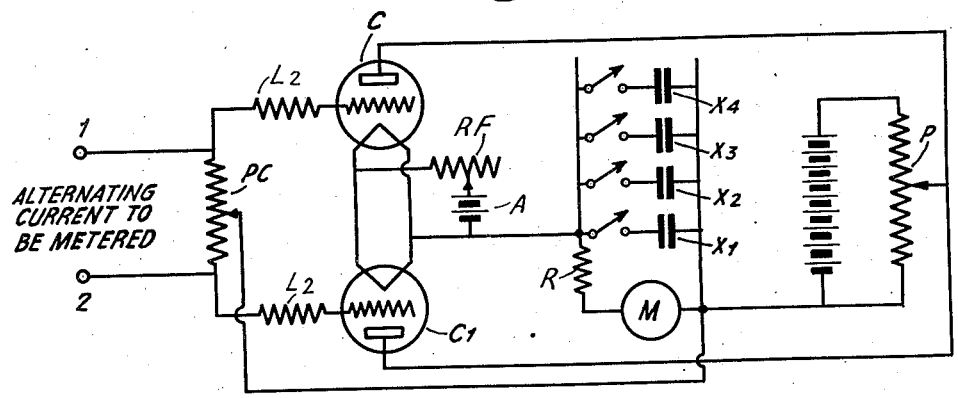
INVENTOR
JAMES W. CONKLIN
BY
ATTORNEY Patented Sept. 10, 1935

2,014,102

UNITED STATES PATENT OFFICE 2,014,102

DIRECT READING VACUUM TUBE METER

James W. Conklin, Rocky Point, N. Y., assignor to Radio Corporation of America, a corporation of Delaware Application May 29, 1934, Serial No. 728,081

5 Claims. (Cl. 171—95)

This invention relates to metering devices and in particular to a new and improved direct reading volt meter of the vacuum tube type.

An object of the present invention is to provide a direct reading meter of the thermionic type which is voltage operated, and in which no adjustment is necessary to obtain the desired reading.

A further object of the present invention is to provide a direct reading, peak reading device of the thermionic type by means of which a carrier wave supplied to a modulated transmitter may be metered.

An additional object of the present invention is to provide a meter as briefly described above, which can be adjusted to operate as a sustained peak reading meter and which is therefore useful in regulating the wave produced by keyed transmitters.

A further object of the present invention is to provide a meter as described above, which may be used to give a steady peak reading characteristic of a voice frequency modulated wave to thereby permit regulation of the degree of modulation of said wave.

A main object of the present invention is to provide a device of the nature briefly described above which is simple in structure and operation and in which the thermionic tube draws little plate current and in which the filament need not be heated to a point at which full emission is obtained. Since full filament emission is not required, the meter is accurate as to calibration during the entire life of a thermionic tube. Moreover, the anode source for said tube may be small.

The novel features of my invention have been pointed out with particularity in the claims appended to this specification. The nature of my invention and the operation thereof will be better understood by the following detailed description thereof and therefrom when read in connection with the drawing in which Figures 1 to 3 inclusive illustrate various modifications of my vacuum tube meter. These circuits include the essential features of my invention.

Referring to Figure 1 of the drawing, A is a filament battery, B a plate battery, C a thermionic tube having at least three electrodes, R a high resistance leak, M a sensitive ammeter, and X a condenser. The elements enumerated above are connected as clearly shown in the figure. The contacts 1 and 2 are the input terminals of the meter to which any circuit the energy in which it is desired to be metered, may be connected.

In operation, the energy to be metered is applied to the contacts 1 and 2. The thermionic meter meters the positive peak voltage applied across the grid and cathode of the tube C by way of the contacts 1 and 2. When a positive charge is applied to the grid, the grid will momentarily be positive with respect to the filament and plate current will flow through the condenser X until the charge on said condenser has increased to the point where the filament is essentially at the same or slightly higher positive level as the grid. The grid will then act to restrict the electron flow. The value of the resistance R is preferably high and the capacity of the condenser X is high, so that it will take a moment for the charge to leak off through R and M, giving M time to indicate the peak charge which will be a measure of the peak input voltage.

There may be a slight zero reading, the zero reading being the voltage required to block the tube when there is no energy input to be metered.

As long as the battery B is several times as great as the voltage applied to be measured, the input voltage will be approximately equal to the reading of meter M minus the zero reading thereof.

The larger the capacity of condenser X is made, the greater will be the time required for the discharge through R and the meter may be made to hold the peak reading for several minutes. If a rapid acting meter is desired, it is merely necessary to decrease the capacity of X. This will not materially affect the calibration of the meter M. By making X adjustable the thermionic tube meter may be made to cover a wide range of uses. For example, it may be used to give a steady peak indication of the output of a keyed transmitter or for metering modulated carrier currents. When it is to be used as an ammeter, it may be provided with a shunt or current transformer, the voltage drop across which may be measured by the device. The constants of the circuit may, of course, be determined by the nature of the service to which it is to be put.

In some cases it may be desirable to put a high resistance leak across the input terminals to prevent the grid electrode from floating free with respect to the cathode when it is not connected to an energy source, that is, to a closed circuit. A more complete circuit including the features described above in connection with Figure 1 has been shown in Figure 2. In Figure 2 an additional leak resistance L has been connected across the terminals 1 and 2. A potentiometer P cooperates with the source B to supply energy to the anode circuit of the tube C. The potentiometer includes a switch S2 which, when open, changes potentiometer P into a variable resistance. The emission from the cathode may be regulated by a filament rheostat RF connected as shown by a switch S1 to the source A. The capacity X of Figure 1 has been replaced by a series of capacities X1, X2, X3 and X4, all of which except the first may be connected as shown by way of switches in shunt with the first. This permits the adaptation of my novel thermionic meter to various types of service.

The filament voltage will not be critical in operation as only a small part of the filament emission is used. If the device is sensitive to B battery voltage, the potentiometer will be used to compensate for this by adjusting to zero on the calibration of the meter M when there is no energy applied to the terminals 1 and 2. The function of L is, as stated hereinbefore, to prevent opening of the grid circuit when the meter is not connected to a source of energy to be metered. The resistance L2 limits the amount of current drawn in the grid circuit.

In some cases it may be desirable to have a meter with which both positive and negative peaks of the wave may be metered. In accordance with my novel invention two meters may be used with their inputs reversed in a circuit as shown in Figures 1 and 2, or I may utilize a single meter in a circuit as shown in Figure 3.

In Figure 3 the resistance L has been replaced by a potentiometer PC. An additional tube C1 has been added. The control grids of C1 and C2 are connected as shown to the terminals of the potentiometer resistance. The anodes of the tubes C1 and C2 are connected as shown to the movable point on the potentiometer P. Here, as in the prior case, the meter M and resistance R in series are shunted by capacities X1, X2, X3 etc. However, as will be seen the meter M is now a portion of the anode circuits of both tubes so that anode current or voltage in either tube will be impressed on the meter and associated condensers and resistance. The meter therefore will be energized by both halves of the applied wave to be metered and accordingly readings characteristic of the positive and negative peaks of the energy are produced by the meter.

Having thus described my invention and the operation thereof what I claim is:

1. A current meter comprising a thermionic tube having an anode, a cathode and a control grid, leads connected with the control grid and cathode of said tube for applying energy to be metered between said control grid and cathode, a resistance in shunt with said leads, an impedance and a meter in series connected with the cathode of said tube, a condenser connected in shunt to said series impedance and meter, and a source of voltage connected between the anode and cathode of said tube by a circuit including said series impedance and meter.

2. An alternating current volt meter comprising a thermionic tube having an anode, a cathode and a control grid, leads one of which includes a resistance connected with the control grid and cathode of said tube for applying energy to be metered between said control grid and cathode, a resistance in shunt with said leads, an impedance and a meter in series connected with the cathode of said tube, a plurality of condensers of different value connected by switches in shunt to said impedance and meter, and a source of voltage connected between the anode and cathode of said tube by a circuit including said impedance and meter.

3. A meter comprising a pair of thermionic tubes each having an anode, a cathode and a control grid, a circuit for applying the energy to be metered between the grids of said tubes, a source of voltage, a connection between said source of voltage and the anodes of said tubes, an impedance and a meter in series connecting said source of voltage to the cathodes of said tubes, and a condenser connected in parallel with said impedance and meter.

4. An alternating current meter comprising a pair of thermionic tubes each having an anode, a cathode and a control grid, a resistance connected between the control grids of said tubes, a circuit for applying the energy to be metered to said resistance, a source of voltage, a connection between a point on said source of voltage and the anodes of said tubes, a resistance and a meter in series connecting a point on said source to the cathodes of said tubes, a plurality of condensers, and switching means for connecting one or more of said condensers in parallel with said resistance and meter.

5. An alternating current meter comprising a pair of thermionic tubes each having an anode, a cathode and a control grid, a plurality of resistances connected between the control grids of said tubes, a circuit for applying the energy to be metered to one of said resistances, a potentiometer and a source of voltage in parallel, a connection between a point on said potentiometer and the anodes of said tubes, a resistance and a meter in series connecting a point on said potentiometer to the cathodes of said tubes, a plurality of condensers, and switching means for connecting said condensers in parallel with said resistance and meter.

JAMES W. CONKLIN.